United States Patent [19]

Savit

[11] Patent Number: 4,581,723

[45] Date of Patent: Apr. 8, 1986

[54] METHOD FOR MAINTAINING A CONSTANT TENSION ON A SEISMIC MARINE CABLE

[75] Inventor: Carl H. Savit, Houston, Tex.

[73] Assignee: Western Geophysical Company of America, Houston, Tex.

[21] Appl. No.: 485,704

[22] Filed: Apr. 18, 1983

[51] Int. Cl.[4] .................................................. G01V 1/38
[52] U.S. Cl. ...................................... 367/20; 367/130; 367/15; 254/274
[58] Field of Search ............ 114/215; 73/158, 862.39, 73/862.45; 254/266, 274, 275, 325; 181/110, 112; 367/15, 19, 20, 106, 130, 153, 154

[56] References Cited

U.S. PATENT DOCUMENTS

| | | | |
|---|---|---|---|
| 3,181,644 | 5/1965 | Roever | 367/15 |
| 3,265,359 | 8/1966 | Bowden | 254/274 |
| 3,276,746 | 10/1966 | Berne | 254/326 |
| 3,279,761 | 10/1966 | Schreiber | 254/274 |
| 3,343,810 | 9/1967 | Parnell | 254/274 |
| 4,196,888 | 4/1980 | Tande et al. | 254/266 |
| 4,200,052 | 4/1980 | Cunningham et al. | 254/274 |
| 4,314,363 | 2/1982 | Thigpen et al. | 367/16 |
| 4,323,222 | 4/1982 | Dempster et al. | 254/274 |

Primary Examiner—Thomas H. Tarcza
Assistant Examiner—Ian J. Lobo
Attorney, Agent, or Firm—William A. Knox

[57] ABSTRACT

A method for maintaining a substantially constant tension on a towed seismic cable, wherein the instantaneous towing force and the instantaneous cable displacement relative to a fixed shipboard reference are continously measured and sampled. A microprocessor associated with a servo controlled capstan device, uses those measurements to pay out cable or to retrieve cable in response to an increase or decrease in the instantaneous towing force. The microprocessor also tries to minimize the average cable displacement.

5 Claims, 4 Drawing Figures

METHOD FOR MAINTAINING A CONSTANT TENSION ON A SEISMIC MARINE CABLE

BACKGROUND OF THE INVENTION

1. Field of the Invention:

This invention provides a method for maintaining a substantially constant tension on a marine seismic hydrophone streamer cable to minimize towing noise due to acceleration and jerk.

2. Discussion of the Prior Art

In marine seismic exploration, a long streamer cable that contains a plurality of hydrophones is towed behind a ship. Acoustic waves are periodically generated in the water. The acoustic waves are reflected from subterranean earth layers and return to the hydrophones. The hydrophones detect the reflected acoustic waves and convert them to electrical signals. The electrical signals are transmitted to the ship where they may be processed and recorded on a storage medium such as magnetic tape.

At sea, the towing ship is subject to periodic accelerations due to heave, pitch, roll and yaw. Those erratic accelerations are unavoidably transmitted mechanically to the cable to create noise that contaminates the desired signal. The erratic ship accelerations further impose large varying tensions on the streamer cable itself.

Various systems have been devised to isolate the streamer cable from excessive mechanical shocks. One known method involves insertion of an elastic link between the cable tow line and the streamer itself. Such elastic links may have a relaxed length of up to 300 feet and are capable of stretching 40% of their relaxed length. In another technique, the cable is payed out or reeled in yo-yo fashion in response to changes in tension. For that purpose the cable storage reel is used. However a cable reel capable of storing two or more miles of streamer cable is very large. The moment of inertia of the reel is too great to permit a prompt response to rapid tension changes.

In seismic exploration, it is essential to know the geometry of the hydrophone streamer cable in relation to the towing ship, the ship being the geographic point of reference. Known systems, whether they be an elastic link, a yo-yo type system or a combination of both, permit large variations in the ship-streamer geometry, and of course, that variation is an unknown quantity. Because of that, the actual location of the streamer cable is only imperfectly known.

SUMMARY OF THE INVENTION

It is an object of this invention to provide a servo system that promptly responds to a change in streamer-cable tension. The system pays out cable if the towing tension exceeds a defined upper limit and recovers cable when the tension drops below a lower threshold. The system always attempts to minimize the average displacement of the tow cable, relative to a fixed shipboard reference.

In accordance with an aspect of this invention, a load cell or tensiometer is secured to the tow cable of a hydrophone streamer to continuously measure the towing tension. A position sensor is provided whose output signal is proportional to the displacement between a fixed reference point on the towing ship and an arbitrary fiducial mark or datum on the tow cable. The output signals from the load cell and the position sensor are transmitted to a microprocessor associated with a servo drive system. The drive system may be a fast-acting capstan drive for paying out or recovering the tow cable. The amount of cable payout or recovery is a function of the measured towing tension and the average displacement of the datum.

In accordance with another aspect of this invention, means are provided to sample and record the instantaneous displacement at desired intervals.

In accordance with a further aspect of the invention the microprocessor samples the instantaneous towing tension at desired intervals and maintains a running average of the samples. The microprocessor statistically determines the upper and lower tension limits that will trigger the cable payout or recovery functions. The limits are continuously updated.

In accordance with another aspect of this invention, the tow cable is compliantly coupled to the servo-driven capstan to prevent application of abrupt tension changes to the tow cable.

BRIEF DESCRIPTION OF THE DRAWINGS

The benefits and advantages of this invention will best be understood by reference to the detailed description and the drawings, wherein.

DETAILED DESCRIPTION OF THE INVENTION

Figure 1:
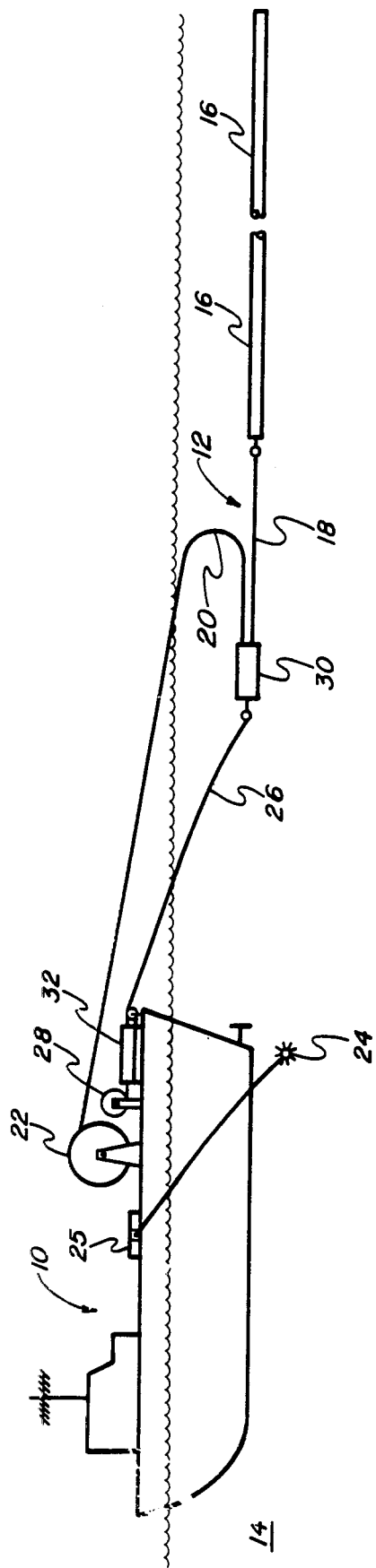
FIG. 1 is a side view of a ship towing a seismic cable through a body of water.
Figure 2:
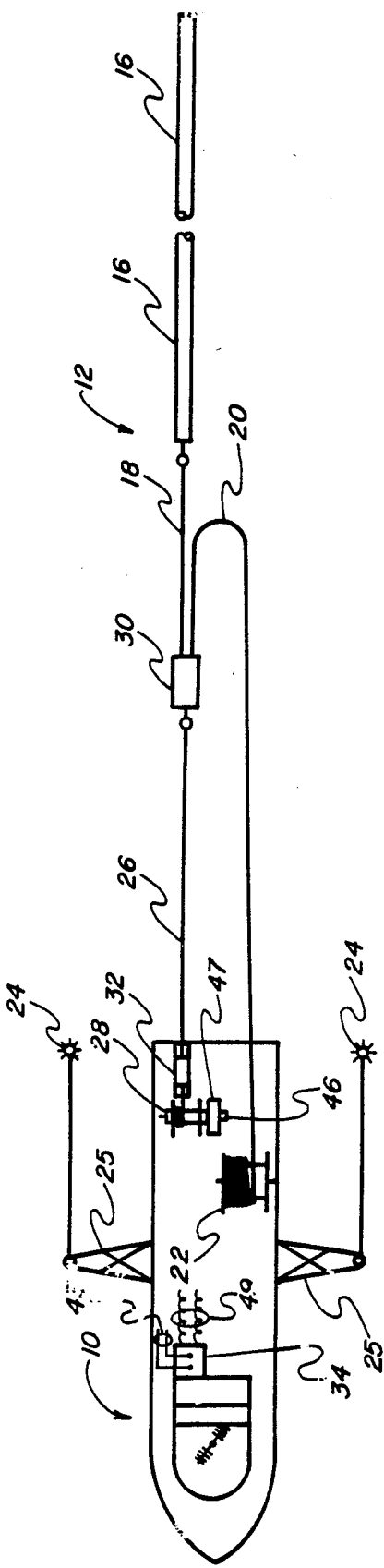
FIG. 2 is a plan view of the arrangement of FIG. 1.

Referring now to FIGS. 1 and 2 there is shown a ship 10 towing a hydrophone streamer cable assembly 12 through a body of water 14. Cable assembly 12 includes the streamer cable 16, which contains a plurality of hydrophones (not shown) that are electrically coupled together in groups by suitable conductors. The streamer cable 16 is secured to tow cable 18 and a lead-in 20. Tow cable 18 and lead-in 20 include a plurality of electrical and/or optical signal transmission lines for transmitting hydrophone signals to ship 10 for processing.

The free end of slack-line bight 20 is secured to a cable storage reel 22. When the streamer cable assembly 12 is not in use, the entire cable assembly is reeled up on the storage reel. A compliant mechanical filter such as a pneumatic spring may be incorporated into cable assembly 12 if desired. At the storage reel the separate signal transmission lines are fanned out for connection to seismic signal processing equipment, not shown. Usually, a sound source, such as an an array of air guns 24, is trailed behind, or to one or both sides of, ship 10 from a suitable outrigger 25.

The cable towing tension is taken up by tow line 26, the left end of which is attached to a servo-controlled capstan device 28. Tow line 26 may conveniently be a ¾ inch stainless steel cable. The right hand end of tow line 26 is secured to the head end of the streamer through a towing link 30 and tow cable 18. A suitable towing link is disclosed in U.S. Pat. No. 4,317,185, assigned to the assignee of this invention, said patent being incorporated herein by reference. Tow line 26 will normally assume a shallow parabolic configuration due to water resistance when under tow.

Capstan 28 may be of the drum or of the continuous endless belt type commonly used to move cable or wire through insulating-plastic extruder systems. One such device is made by the Davis Standard Division of Crompton and Knowles Corp., Pawcatuck, Conn. The capstan may be driven by an electric or a hydraulic motor that is amenable to servo control.

Figure 3:
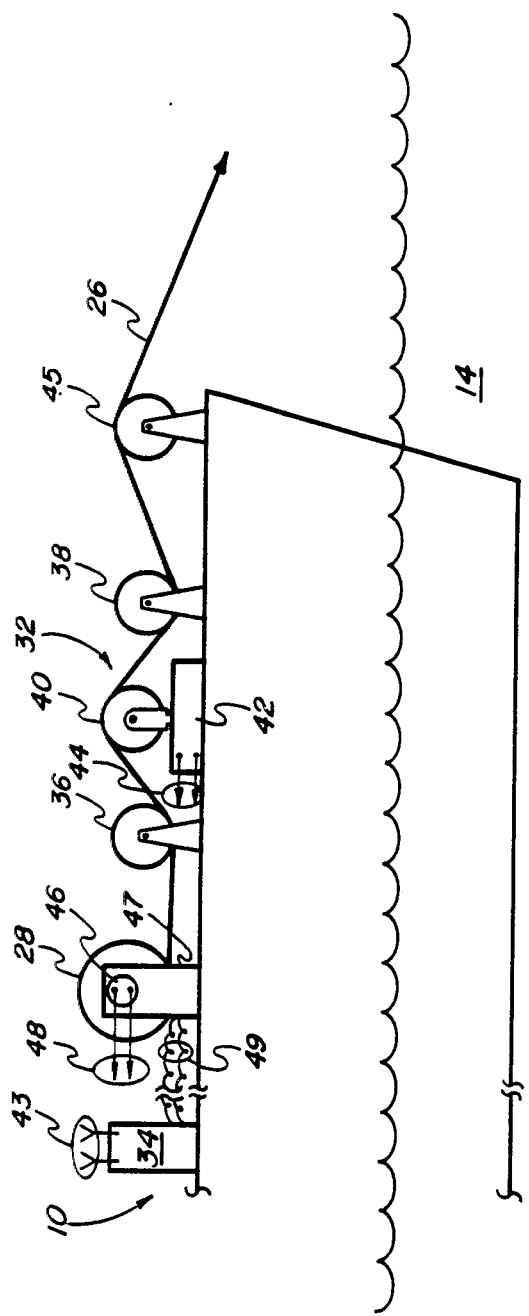
FIG. 3 is a more detailed view of the constant tension system of this invention.

FIG. 3 is a detailed view of cable-handling equipment at the ship's stern. There is shown a feed-through load cell or tensiometer assembly 32 such as the Running Line Tensiometer made by W. C. Dillon and Co. of Van Nuys, Calif. The tensiometer consists of two idler sheaves 36 and 38 and a center sheave 40 which is attached to the load cell itself 42. Any change in the tension of tow line 26 tends to press center sheave 40 and its support against load cell 42. The digital output from load cell 42 is fed to the inputs 43 of microprocessor 34 over leads 44. A fourth sheave 45 guides towing line 26 over the stern of ship 10. At a velocity of six knots, the towing tension of a streamer cable is on the order of 3500 to 4000 pounds.

Broadly, the purpose of servo-controlled capstan 28 is to release a length of tow line 26 when the load cell senses an increasing force above a predetermined upper force limit and to retrieve a length of tow line 26 when the load cell senses a decreasing towing force below a predetermined lower force limit. That is, the capstan system always tries to maintain the towing force within an assigned towing-force window. At the same time the capstan system endeavors to maintain a datum associated with tow line 26 at an average position relative to a fixed shipboard reference. Of course, the datum need not necessarily be a physical marker on tow line 26. Preferably a multiturn shaft encoder of any well known type having a digital readout is coupled to the capstan drum shaft. The output signal of the encoder defines the absolute position of the drum and hence the position of the tow line datum relative to the ship. The digital output datum signal of shaft encoder 46 is fed to the input terminals 43 of microprocessor 34 via leads 48.

In some respects the system disclosed is a type of yo-yo system such as is taught by U.S. Pat. No. 4,314,363, assigned to the assignee of this invention. Another patent of interest is U.S. Pat. No. 3,276,746 for a stabilizing system for an offshore oil drilling rig.

The servo system 47 of any well-known electric, air or hydraulic type, preferably hydraulic, that controls the capstan drive is directed by microprocessor 34 over leads 49. The microprocessor continuously samples the instantaneous towing tension or force $F_1$, as measured by the load cell, at convenient sampling intervals such as every ten milliseconds. A running average $\bar{F}$ of the force measurements is updated at each sample interval and a desired statistic such as the standard deviation, $\sigma$, might be used to determine the upper and lower limits of the force window. Or, perhaps the steady-state towing force would be determined and an arbitrary limit n, such as ±500 pounds, might be programmed into the microprocessor by the operator to create the force window. Thus the upper force limit is $F_u = \bar{F} + \sigma$ and the bottom limit is $F_b = \bar{F} - \sigma$. So long as the running-average force F satisfies the inequality $F_u > \bar{F} > F_b$, no action is taken by the capstan system. If $\bar{F}$ becomes greater than $F_u$, a length D of tow line 26 is released. If $\bar{F}$ becomes less than $F_b$, a length $-D$ of tow line 26 is retrieved. The window limits $\pm\sigma$ or $\pm n$ effectively establish a damping coefficient. If those limits were reduced to zero, the system would immediately respond to the slightest change in tension. The system could become unstable.

The microprocessor 34 also monitors the instantaneous displacement of a datum on the cable relative to a shipboard reference by means of shaft encoder 46 having a digital output signal. The shaft encoder counts the number of turns and fractional turns of capstan 28 either clockwise or counterclockwise from an arbitrary starting point. The datum displacement may be sampled at convenient intervals and a running average computed. With knowledge of the capstan drum diameter, the encoder output signal represents a measure of the length of tow line payed out or retrieved.

The tensioning system as a whole then, is a two-level servo system that (1) tries to maintain a substantially constant tow-line force within prescribed limits and (2) tries to maintain the average departure of a datum on the cable, from a shipboard reference, to near zero, that is, to minimize the average displacement of the tow line relative to a fixed reference. The system mechanization will now be discussed briefly.

Let the incremental towing force due to ship motion that develops above or below the steady-state condition be $F_1$. The equilibrium or undisplaced length of the towing line is $L_o$. The displacement or amount of line to be payed out or retrieved to compensate for $F_1$ will be D. The effective Young's modulus will be designated as E. Then the net force in the tow line after an adjustment of length D to compensate for $F_1$, is $$\sigma F = F_1 - ED/(L_o + D)$$

A second, fictitious force $F_2$ is designed to hold the average difference between the tow line datum and the shipboard reference, that is, the drift, to a minimum. That force always acts in opposition to $F_1$. Thus $$F_2 = -kD.$$

where k is a constant that may be modified by the micro-processor over a period of time to minimize cable drift. If k is very large, no corrections to the tow line length will be permitted.

The net total force acting on the system therefore is $$F = F_1 - ED/(L_o + D) - kD.$$

We may solve for D when $F = F_1$:

| | |
|---|---|
| D = 0 | F = $F_1$ |
| D = x | F = $-kx$ | where x is that value of D such that $$F_1 = ED/(L_o + D).$$

Figure 4:
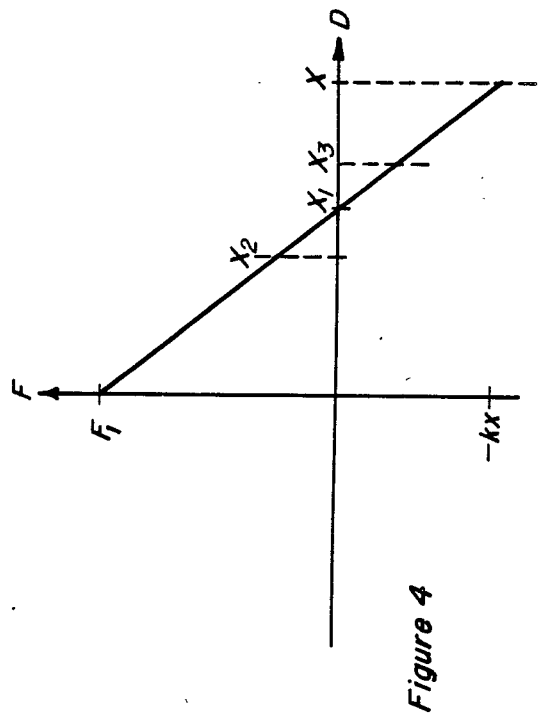
FIG. 4 is a graph showing the relation between towing force and cable displacement.

The relationship will be more easily perceived by reference to FIG. 4 which is a graph in F and D coordinates. The correction D, to render the incremental force $F_1 = 0$, will range from zero to x. The microprocessor attempts to hold the total force to zero by making $D = x_1$. Alternatively, the total force may be held to some small fraction of the incremental force or $$F = mF_1$$

which gives rise to values of D of $x_2$ or $x_3$. That range of forces corresponds to the force or tension window mentioned earlier.

An approximate numerical example follows:
From above we have $$F_1 = ED/(L_0+D) \cong ED/L_0.$$

Let $F_1 = 2500$ pounds, the incremental force or tension that would be applied to the tow line due to a sudden increment of ship's velocity, due, say to wave motion, from about 6 to about 9 knots over a period of time t. Let $E \cong 2 \times 10^4$ pounds. E, it will be remembered, is an effective Young's modulus designed to hold the amount of tow-line payout within reasonable limits. Let $L_0 = 500$ feet. Therefore, $$D \cong 2500 * 500/(2 * 10)^4 \cong 62.5 \text{ feet}.$$

If $t = 5$ seconds, the linear velocity of tow-line 26 during payout will be about 12.5 feet per second which is within the cable delivery capacity of known capstan systems.

As with the towing force, the average displacement D should lie within a displacement window such as $x_2 < x_1 < x_3$ (FIG. 4). The displacement limits correspond to the upper and lower towing force limits. However, the microprocessor 34 could be programmed to reduce the displacement limits to some fraction of $x_2$ and $x_3$. With reference to the towing ship, $x_2$ might be the forward displacement limit and $x_3$, the aft displacement limit. The amount of tow line payout would be restricted or limited if the average displacement approached the aft limit whereas if the average displacement approached the fore limit, retrieval of the tow line would be restricted or limited.

The coefficients E and k are quantities that may be initially input by the operator such as by thumb-wheel switches or a keyboard, which are well known. Thereafter the values may be interactively adjusted by the microprocessor itself to maintain system stability with respect to actual operating conditions over a period of time. If modulus E is reduced in value, more tow line will be payed out over a given time in response to a given increment in the instantaneous towing force. However, if E is reduced too much, the required linear velocity of the tow-line during payout could exceed the capability of the capstan. An increase in the value for k to a very large number would cause the capstan to lock up. If k is reduced to zero on the other hand, there would be no restraint on the average tow-line displacement. Therefore system stability is determined by adjustment of the values for E and k.

Other arrangements may be conceived by those skilled in the art, which would be encompassed by the scope and content of this disclosure which is limited only by the appended claims. For example, the tensiometer, instead of being secured to the deck of the ship, could be fastened in series with the tow line. A pneumatic or hydraulic spring could be added in series with the capstan drum by means of a suitable pulley arrangement.

I claim as my invention:

1. A method for maintaining a substantially constant force on, and an average displacement relative to a shipboard reference of, a ship-towed seismic cable having a tow line secured to the head end thereof, comprising the steps of:
   sampling and measuring at desired sample intervals, the instantaneous towing force exerted by said towed cable;
   establishing a force window having upper and lower force limits;
   paying out a portion of said tow line when the measured towing force exceeds said upper force limit and retrieving a portion of said tow line when the measured towing force falls below said lower force limit;
   measuring the average displacement of said tow line relative to a fixed shipboard reference;
   minimizing the average displacement of said tow line;
   maintaining a running average of the instantaneous towing-force measurements over a desired time interval;
   determining a desired statistic from said towing-force measurements; and
   applying said statistic to said running average to define the upper and lower limits of said force window.

2. The method as defined by claim 1, comprising the further steps of:
   establishing a desired base velocity for said ship;
   determining the steady-state towing force exerted by said seismic cable corresponding to said base velocity; and
   defining preselected upper and lower limits of said force window relative to said steady-state towing force.

3. The method as defined by claim 1, comprising the further steps of:
   measuring, at desired sample intervals, the instantaneous displacement of a datum, associated with said tow line, relative to a fixed shipboard reference;
   determining a running average of said displacement measurements over a desired time interval
   defining an average displacement window having preselected fore and aft displacement limits; and
   limiting the amount of pay-out of said tow line when said running average displacement approaches said aft displacement limit and limiting the amount of retrieval of said tow line when said running average displacement approaches the forward displacement limit.

4. The method as defined by claim 2, comprising the further steps of
   computing a running average of said instantaneous towing force measurements;
   paying out or retrieving said tow line according to whether said running average increases above or decreases below the limits of said force window.

5. The method as defined by claim 3, comprising the step of:
   defining a towing-force damping coefficient from said desired statistic.

* * * * *